United States Patent
Ishihara et al.

(10) Patent No.: US 10,168,483 B2
(45) Date of Patent: Jan. 1, 2019

(54) METHOD FOR CONNECTING OPTICAL WAVEGUIDE AND OPTICAL FIBER, SEMICONDUCTOR OPTICAL DEVICE, AND METHOD FOR MANUFACTURING SEMICONDUCTOR OPTICAL DEVICE HAVING OPTICAL FIBER CONNECTED THERETO

(71) Applicant: FUJIKURA LTD., Tokyo (JP)

(72) Inventors: Hiroki Ishihara, Sakura (JP); Ryokichi Matsumoto, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 15/450,976

(22) Filed: Mar. 6, 2017

(65) Prior Publication Data

US 2017/0176685 A1 Jun. 22, 2017

Related U.S. Application Data

(63) Continuation of application No. PCT/JP2015/079144, filed on Oct. 15, 2015.

(30) Foreign Application Priority Data

Oct. 22, 2014 (JP) .................................. 2014-215537

(51) Int. Cl.
*G02B 6/30* (2006.01)
*G02B 6/36* (2006.01)
*G02B 6/00* (2006.01)

(52) U.S. Cl.
CPC ............... *G02B 6/305* (2013.01); *G02B 6/00* (2013.01); *G02B 6/3636* (2013.01)

(58) Field of Classification Search
CPC ............................ G02B 6/305; G02B 6/3636
See application file for complete search history.

(56) References Cited

U.S. PATENT DOCUMENTS 4,930,854 A * 6/1990 Albares .................... G02B 6/30
385/49
5,991,493 A * 11/1999 Dawes .................... C03B 19/12
385/141

(Continued)

FOREIGN PATENT DOCUMENTS

JP 2000-105324 A 4/2000
JP 2001-124957 A 5/2001

(Continued)

OTHER PUBLICATIONS

International Search Report dated Dec. 15, 2015, issued in counterpart International Application No. PCT/JP2015/079144 (2 pages).

(Continued)

*Primary Examiner* — Omar R Rojas
(74) *Attorney, Agent, or Firm* — Westerman, Hattori, Daniels & Adrian, LLP

(57) ABSTRACT

The present invention makes it possible to prevent an optical loss in association with mode field diameter conversion and to prevent deformation in a mode field converter. The present invention includes: (a) temporarily fixing an end surface of an optical fiber (1) to an end surface of a core part (8) via a highly-viscous resin (3); and (b) after the step (a), while butting the end surface of the optical fiber (1) against the end surface of the core part (8) through the highly-viscous resin (3), fixing the optical fiber (1) to a semiconductor optical device (100) at a place away from the end surface of the optical fiber (1).

10 Claims, 7 Drawing Sheets

(56) References Cited

U.S. PATENT DOCUMENTS

| | | | |
|---|---|---|---|
| 7,492,995 B2* | 2/2009 | Kuroda | G02B 6/30 |
| | | | 385/15 |
| 8,326,100 B2 | 12/2012 | Chen et al. | |
| 2007/0025663 A1* | 2/2007 | Kuroda | G02B 6/30 |
| | | | 385/49 |
| 2007/0086707 A1 | 4/2007 | Suzuki et al. | |
| 2009/0297093 A1 | 12/2009 | Webster et al. | |
| 2012/0076465 A1* | 3/2012 | Chen | G02B 6/14 |
| | | | 385/124 |

FOREIGN PATENT DOCUMENTS

| | | |
|---|---|---|
| JP | 2001-324641 A | 11/2001 |
| JP | 2005-173575 A | 6/2005 |
| JP | 2006-221031 A | 8/2006 |
| JP | 2007-93647 A | 4/2007 |
| JP | 2010-139629 A | 6/2010 |
| WO | 2011/078789 A1 | 6/2011 |

OTHER PUBLICATIONS

Office Action dated May 29, 2018, issued in counterpart Japanese application No. 2016-555194, with English translation. (5 pages).
Office Action dated Jul. 31, 2018, issued in counterpart Japanese Application No. 2016-555194, with English machine translation. (5 pages).

* cited by examiner

REGION A

CROSS-SECTION B-B

CROSS-SECTION C-C

FIG. 8
(a)
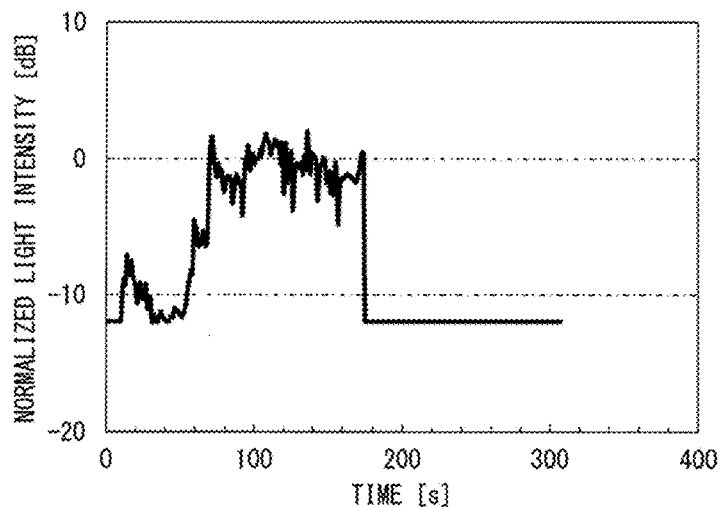
(b)
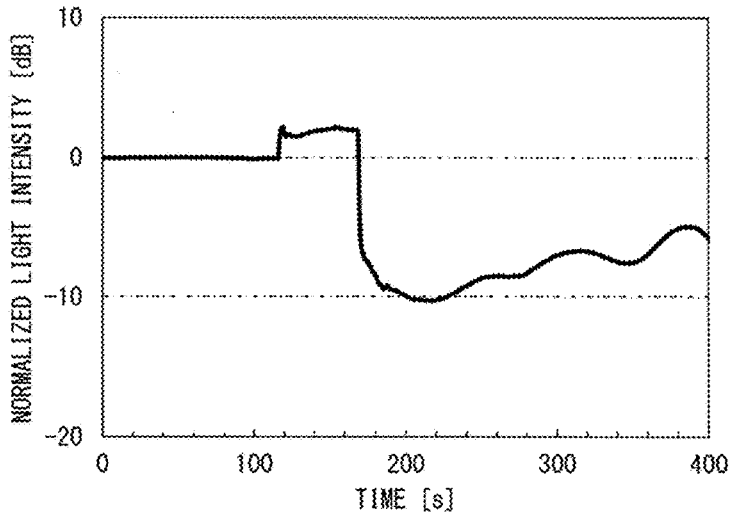

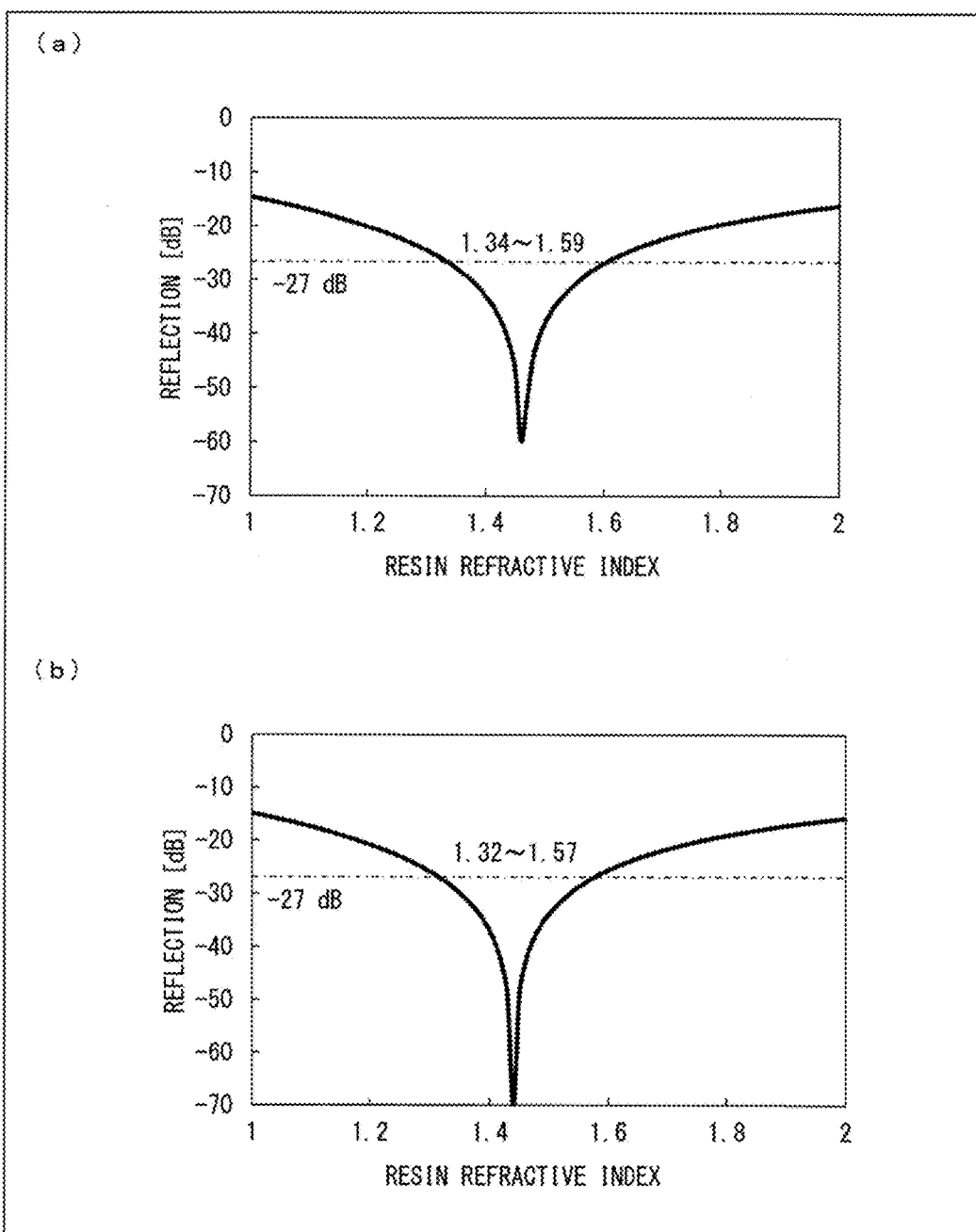

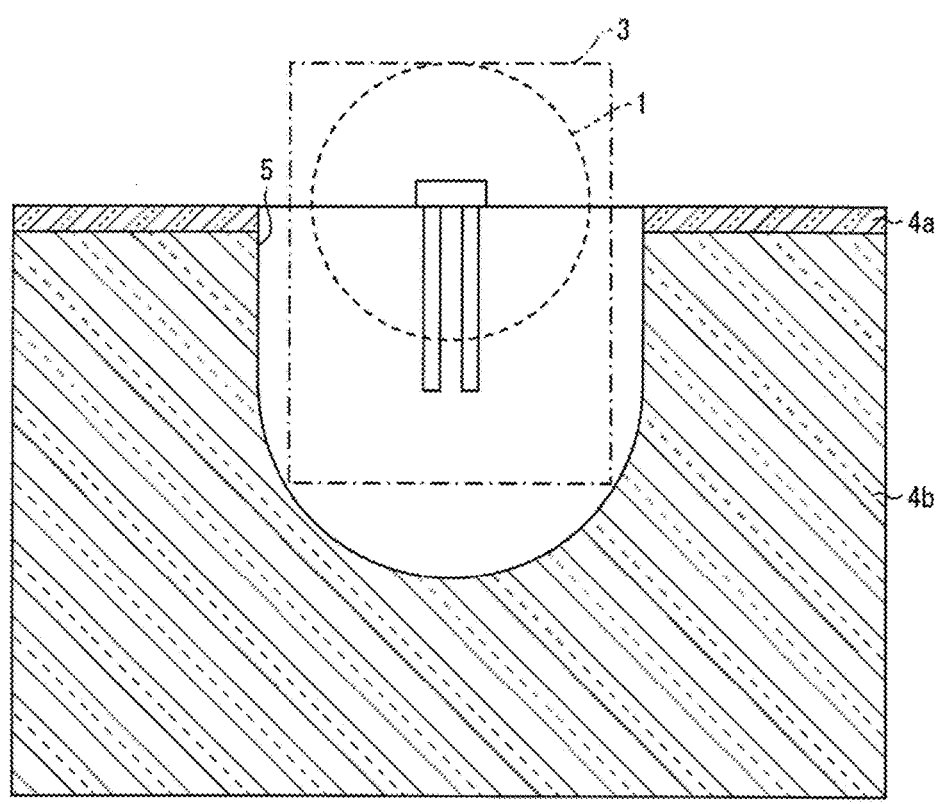

METHOD FOR CONNECTING OPTICAL WAVEGUIDE AND OPTICAL FIBER, SEMICONDUCTOR OPTICAL DEVICE, AND METHOD FOR MANUFACTURING SEMICONDUCTOR OPTICAL DEVICE HAVING OPTICAL FIBER CONNECTED THERETO

CROSS-REFERENCE TO RELATED APPLICATIONS

This application is a Continuation of PCT International Application Serial No. PCT/JP2015/079144 filed on Oct. 15, 2015. This application is based upon and claims the benefits of priority from prior Japanese Patent Application No. 2014-215537 filed on Oct. 22, 2014.

TECHNICAL FIELD

The present invention relates to a method for connecting an optical fiber to a tapered optical waveguide provided in a semiconductor optical device, a semiconductor optical device, and a method for manufacturing a semiconductor optical device to which an optical fiber is connected.

BACKGROUND ART

From now on, a transponder that is contained in a transmission device such as a router is expected to be made smaller in size to approximately ⅒ in terms of an area ratio. In accordance with this, devices (a light source, an optical modulator, a receiver, etc.) that are contained in the transponder are required to be made extremely smaller in size.

Against a background of this, a semiconductor optical device has attracted attention. A semiconductor optical device is a generic name for an optical device that is made of a semiconducting material. Typical examples of the semiconducting material include indium phosphide, silicon, gallium arsenide, and the like.

A semiconductor optical device can be more easily made smaller in size than a conventional optical device. In a case where an optical modulator is taken as an example, a lithium-niobate modulator that is contained in a transponder having a housing of 5 inches×7 inches has a dimension of approximately 5 cm. Meanwhile, a semiconductor optical modulator that is made of indium phosphide or silicon has a dimension of not more than several millimeters. A semiconductor optical modulator thus can have a size that is not more than ⅒ the size of a lithium-niobate modulator.

Meanwhile, a semiconductor optical device has a problem of a mode mismatch between the semiconductor optical device and an optical fiber that is used in a transmission network. Specifically, an optical waveguide (single mode) provided in a semiconductor optical device has a width of approximately several hundred nm to several μm. Meanwhile, an optical fiber has a core diameter of approximately 10 μm. Thus, in a case where optical coupling between the semiconductor optical device and the optical fiber is attempted, a mode mismatch occurs. This causes a great coupling loss.

There is known a technique in which a so-called mode field conversion structure is used and a mode field diameter conversion is carried out between (a) an optical waveguide provided in a semiconductor optical device and (b) an optical fiber so that a coupling loss caused by such a mode mismatch as described earlier is prevented.

Examples of the mode field conversion structure include a lens that is provided on an end surface of an optical fiber. Note, however, that use of the lens increases the number of components and a tolerance in optical coupling is determined in accordance with a mode field diameter of an optical waveguide provided in a semiconductor optical device. In view of this, extremely highly accurate mode field diameter conversion is required. Thus, use of the lens as the mode field conversion structure makes it difficult to achieve mode field diameter conversion that is stable and low in coupling loss.

Under the circumstances, attention is drawn to a technique in which a tapered optical waveguide is provided in a semiconductor optical device and the tapered optical waveguide is used as a mode field converter. Examples of this technique are disclosed in Patent Literatures 1 and 2. According to the techniques disclosed in Patent Literatures 1 and 2, a tapered optical waveguide made of silica (specific refractive index: approximately 1.45) is used as a core and the tapered optical waveguide is surrounded with a clad filled with air (specific refractive index: 1), so that light is allowed to be confined in the tapered optical waveguide.

CITATION LIST

Patent Literatures

[Patent Literature 1]
Specification of U.S. Pat. No. 8,326,100 (Registration Date: Dec. 4, 2012)
[Patent Literature 2]
International Publication No. 2011/078789 (Publication Date: Jun. 30, 2011)

SUMMARY OF INVENTION

Technical Problem

In order to connect an optical fiber and a tapered optical waveguide provided in a semiconductor optical device, it is necessary to directly combine the optical fiber and the tapered optical waveguide so that an end surface of the tapered optical waveguide and an end surface of the optical fiber face each other, and it is also necessary to fix a vicinity of the end surface of the optical fiber and a vicinity thereof by use of, for example, an ultraviolet curing resin. Note, however, that a connection between the optical fiber and the tapered optical waveguide by the above method causes the following problem (A).

(A) Cure shrinkage in, for example, the ultraviolet curing resin causes axial deviation in the optical fiber. This may (i) make an optical loss high and (ii) cause deformation (e.g., distortion) in a mode field converter due to contraction stress. In addition, in order to surround, with a clad filled with air, a tapered optical waveguide made of silica, it is necessary for the ultraviolet curing resin or the like to have a specific refractive index of 1 to 1.45. Note, however, that almost all resins having a specific refractive index of 1 to 1.45 shrink by approximately 10% due to curing.

The present invention has been made in view of the problems, and an object of the present invention is to provide a method for connecting an optical waveguide and an optical fiber, the method making it possible to prevent (i) an optical loss associated with mode field diameter conversion and (ii) deformation in a mode field converter; a semiconductor optical device; and a method for manufacturing a semiconductor optical device to which an optical fiber is connected.

Solution to Problem

In order to attain the object, a connection method in accordance with an aspect of the present invention for connecting an optical fiber to an optical waveguide provided in a semiconductor optical device, includes: (a) temporarily fixing an end surface of the optical fiber to an end surface of the optical waveguide via a temporarily fixing member; and (b) after the step (a), while butting the end surface of the optical fiber against the end surface of the optical waveguide through the temporarily fixing member, fixing the optical fiber to the semiconductor optical device at a place away from the end surface of the optical fiber.

With the arrangement, the end surface of the optical fiber is temporarily fixed to the end surface of the optical waveguide. This makes it possible to (i) prevent an optical loss by preventing axial deviation in the optical fiber which axial deviation is caused by cure shrinkage in, for example, an ultraviolet curing resin and (ii) prevent deformation in a mode field converter.

In order to attain the object, a semiconductor optical device in accordance with an aspect of the present invention includes: an optical waveguide, the optical waveguide having an end surface to which an end surface of an optical fiber is connected via a fixing member.

With the arrangement, in order to connect the end surface of the optical fiber to the end surface of the optical waveguide, it is possible to fix the optical fiber to the optical waveguide without the need to fix the end surface and/or its vicinity of the optical fiber by use of, for example, an ultraviolet curing resin. This makes it possible to achieve a high-quality semiconductor optical device in which (i) an optical loss is prevented by preventing axial deviation in the optical fiber which axial deviation is caused by cure shrinkage in, for example, an ultraviolet curing resin and (ii) deformation in a mode field converter is prevented.

In order to attain the object, a method in accordance with an aspect of the present invention for manufacturing a semiconductor optical device to which an optical fiber is connected, the method includes: (a) fixing an end surface of the optical fiber to an end surface of an optical waveguide of the semiconductor optical device via a fixing member; and (b) after the step (a), while butting the end surface of the optical fiber against the end surface of the optical waveguide through the fixing member, fixing the optical fiber to the semiconductor optical device at a place away from the end surface of the optical fiber.

The arrangement makes it possible to manufacture the semiconductor optical device in accordance with an aspect of the present invention.

Note that each of the temporarily fixing member and the fixing member can be assumed to be provided to, for example, the end surface of the optical fiber or the end surface of the optical waveguide.

Advantageous Effects of Invention

An aspect of the present invention makes it possible to prevent (i) an optical loss associated with mode field diameter conversion and (ii) deformation in a mode field converter.

(a) of FIG. 8 is a graph showing a relationship between elapsed time and a normalized light intensity in a case where no temporarily fixing member is provided. (b) of FIG. 8 is a graph showing a relationship between elapsed time and a normalized light intensity in a case where an ultraviolet curing resin is applied to a vicinity of an end surface of the optical fiber.

(a) of FIG. 9 is a graph showing a relationship between a specific refractive index of a temporarily fixing member and an amount of light reflected from a boundary between the temporarily fixing member and an end surface of an optical fiber. (b) of FIG. 9 is a graph showing a relationship between a specific refractive index of a temporarily fixing member and an amount of light reflected from a boundary between the temporarily fixing member and an end surface of an optical waveguide.

FIG. 10 is a cross-sectional view showing an example in which a temporarily fixing member is provided by being extended to a substrate part.

DESCRIPTION OF EMBODIMENTS

An embodiment for carrying out the present invention is described below.

Figure 1:
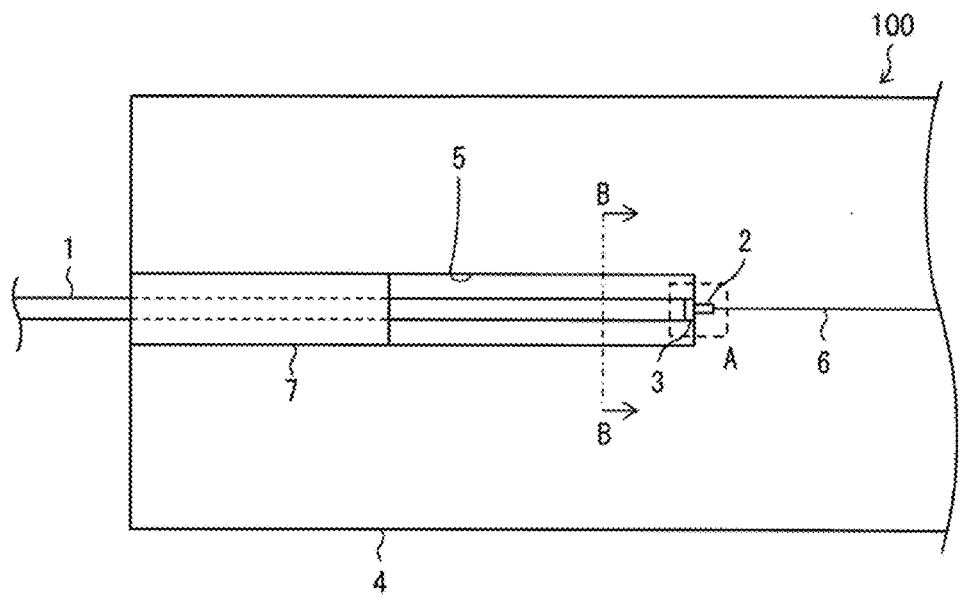
FIG. 1 is a top view of a semiconductor optical device in accordance with an embodiment of the present invention.

FIG. 1 is a top view of a semiconductor optical device 100 in accordance with the present embodiment. The semiconductor optical device 100 includes a mode field converter 2, a highly-viscous resin 3, a substrate part 4 of the semiconductor optical device, a groove 5, a fine line optical waveguide 6, and an ultraviolet curing resin 7, and is connected with an optical fiber 1.

The optical fiber 1, which is a so-called polarization maintaining fiber extending from the light source (not illustrated) side, extends to the mode field converter 2. The optical fiber 1 has a diameter of approximately 125 µm, and the optical fiber 1 has a core having a diameter of approximately 10 µm.

The mode field converter 2 carries out mode field diameter conversion between the fine line optical waveguide 6 and the optical fiber 1. An example of an arrangement of the mode field converter 2 is described later.

The highly-viscous resin (temporarily fixing member, fixing member) 3 is provided on an end surface of the optical fiber 1 and is butted against the mode field converter 2. In other words, the optical fiber 1 is connected to the mode field converter 2 via the highly-viscous resin 3. The highly-viscous resin 3 is a transparent resin and has a specific refractive index of 1.44. Further, the highly-viscous resin 3 is literally highly viscous and preferably has a viscosity of not less than 30 Pa·S and not more than 1000 Pa·S. Note that "Pa·S" is "pascal second", which is a unit indicative of a viscosity in an SI unit system.

The substrate part 4 of the semiconductor optical device is a substrate made of silicon. The substrate part 4 is provided with the groove 5. The groove 5 has a width of approximately 300 μm. As illustrated in FIG. 1, the optical fiber 1 is provided so as to be parallel with the groove 5. Use of the substrate part 4 which is made of silicon makes it possible to achieve a semiconductor optical device that is inexpensive and has a fine structure. Note that the substrate part 4 may be made of indium phosphide. Use of the substrate part 4 which is made of indium phosphide makes it possible to achieve a semiconductor optical device that has an excellent optical characteristic.

The fine line optical waveguide 6, which is, for example, an optical waveguide that has (i) a core made of silicon and (ii) a clad made of silica stacked on a surface of the silicon, is connected to the mode field converter 2. Though not illustrated, the fine line optical waveguide 6 has, on an opposite side from the mode field converter 2, an end that is connected to, for example, an optical modulator. The fine line optical waveguide 6 has a width of approximately 600 nm and a specific refractive index of 3.48.

The ultraviolet curing resin 7 is provided so as to fix the optical fiber 1. The ultraviolet curing resin 7 is applied to the groove 5 at a place away from the mode field converter 2 at a distance of approximately several hundred μm to 1 mm. Curing of the ultraviolet curing resin 7 fixes the optical fiber 1 to the substrate part 4. The ultraviolet curing resin 7 which is kept away from the mode field converter 2 at a certain distance is prevented from entering an air clad part 11 (described later).

Figure 2:
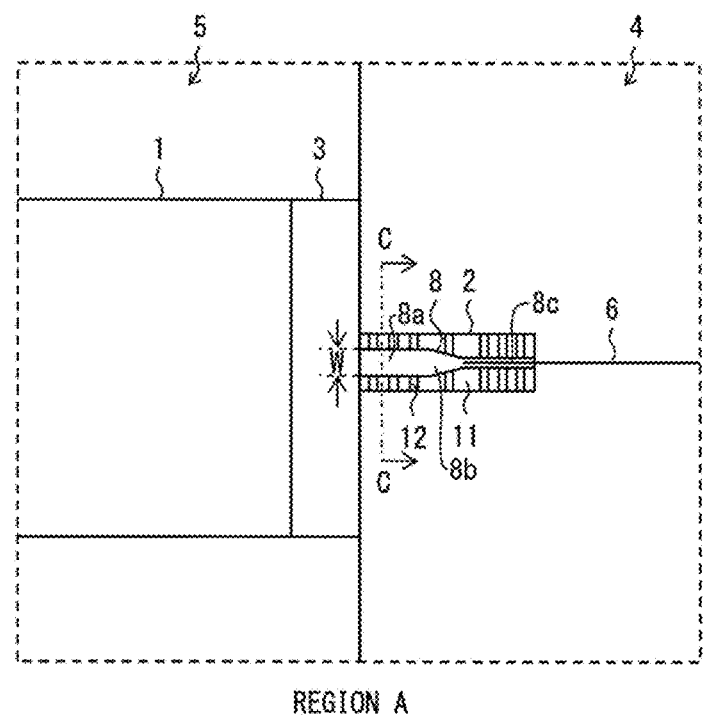
FIG. 2 is an enlarged view of a region A illustrated in FIG. 1.

FIG. 2 is an enlarged view of a region A illustrated in FIG. 1.

The mode field converter 2 has a core part 8, the air clad part 11, and a plurality of bridges 12.

The core part (optical waveguide) 8 is made of silica. The reason why silica is selected as a material of the core part 8 is that a specific refractive index (approximately 1.44) of silica is close to a specific refractive index (core: 1.463, clad: 1.458) of the optical fiber 1. Specifically, in a case where the specific refractive index of the optical fiber 1 and the specific refractive index of the core part 8 are close to each other, mode field diameter matching is facilitated. This makes it possible to prevent reflection of light from a part of connection between the core part 8 and the optical fiber 1. The core part 8 serves as a part of connection with the optical fiber 1. Against the core part 8, the highly-viscous resin 3 is butted. The core part 8 has (i) a first part 8a that is a part of connection with the optical fiber 1, (ii) a second part 8b that has a taper shape whose diameter is gradually smaller from the optical fiber 1 side toward the fine line optical waveguide 6 side, and (iii) a third part 8c that is a part of connection with the fine line optical waveguide 6. The first part 8a has a diameter W of approximately 10 μm, which is substantially equal to the diameter of the core of the optical fiber 1. The fine line optical waveguide 6 is provided in the third part 8c by, for example, photolithography and an etching process.

The air clad part 11 is filled with air (specific refractive index: 1). The air clad part 11 is a space that is provided so as to surround the core part 8. The mode field converter 2 including the core part 8 and the air clad part 11 has a width, which is substantially uniform regardless of the diameter of the core part 8, of approximately 20 μm.

The following description discusses behavior of light with reference to the fine line optical waveguide 6 side entrance of the mode field converter 2. The mode field converter 2 converts a mode field diameter to 2 μm to 3 μm by causing a radiation mode in a plane direction perpendicular to a direction in which the core part 8 extends, and thereafter the mode field converter 2 converts the mode field diameter to approximately 10 μm in the plane direction. Ten μm is close to the diameter of the core of the optical fiber 1.

The core part 8 has a so-called cantilever structure. Specifically, the fine line optical waveguide 6 side end surface of the core part 8 is fixed to the substrate part 4, whereas the optical fiber 1 side end surface of the core part 8 is unfixed to the substrate part 4. Therefore, the plurality of bridges 12 supports the core part 8 from a side surface of the core part 8. The core part 8 is reinforced by the plurality of bridges 12.

The highly-viscous resin 3 which has been butted against the core part 8 has a thickness of approximately 10 μm. The substrate part 4 has an upper surface that is made of silica.

Figure 3:
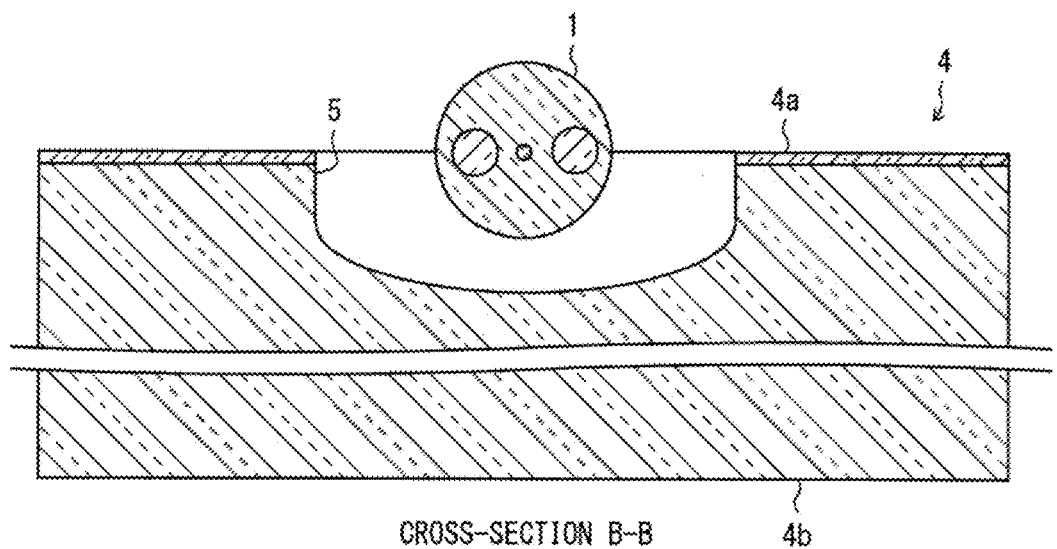
FIG. 3 is a cross-sectional view taken from line B-B illustrated in FIG. 1.

FIG. 3 is a cross-sectional view taken from line B-B illustrated in FIG. 1.

The substrate part 4 includes a silicon substrate 4b having a thickness of approximately 700 μm and a silica layer 4a stacked on the silicon substrate 4b. The silica layer 4a has a thickness of approximately 2 μm on the optical fiber 1 side. The groove 5 has a deepest part having a depth of approximately 100 μm. The optical fiber 1 is provided so that a height of the upper surface of the substrate part 4 and a height of a center of the optical fiber 1 coincide with each other.

Figure 4:
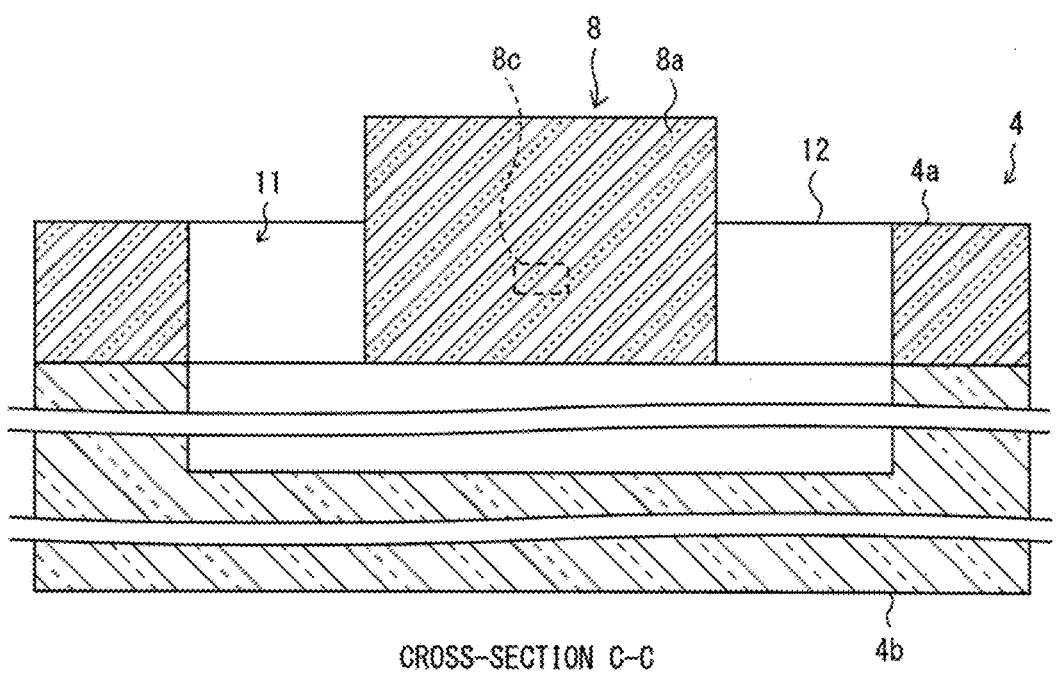
FIG. 4 is a cross-sectional view taken from line C-C illustrated in FIG. 2.

FIG. 4 is a cross-sectional view taken from line C-C illustrated in FIG. 2.

The silica layer 4a has a thickness of approximately 4 μm on the mode field converter 2 side. The silica layer 4a has a larger thickness on the mode field converter 2 side than on the optical fiber 1 side. The air clad part 11 which is located on both sides of the first part 8a of the core part 8 has a thickness of approximately 5 μm. Below the first part 8a, a space that extends for approximately 30 μm is provided between the first part 8a and the silicon substrate 4b. In the cross-section C-C, the first part 8a has a height of approximately 7 μm, and the first part 8a has an upper 3 μm part that is located so as to be as high as or higher than the upper surface of the substrate part 4. In FIG. 4, for comparison, the third part 8c of the core part 8 is illustrated by a dotted line for convenience.

Figure 5:
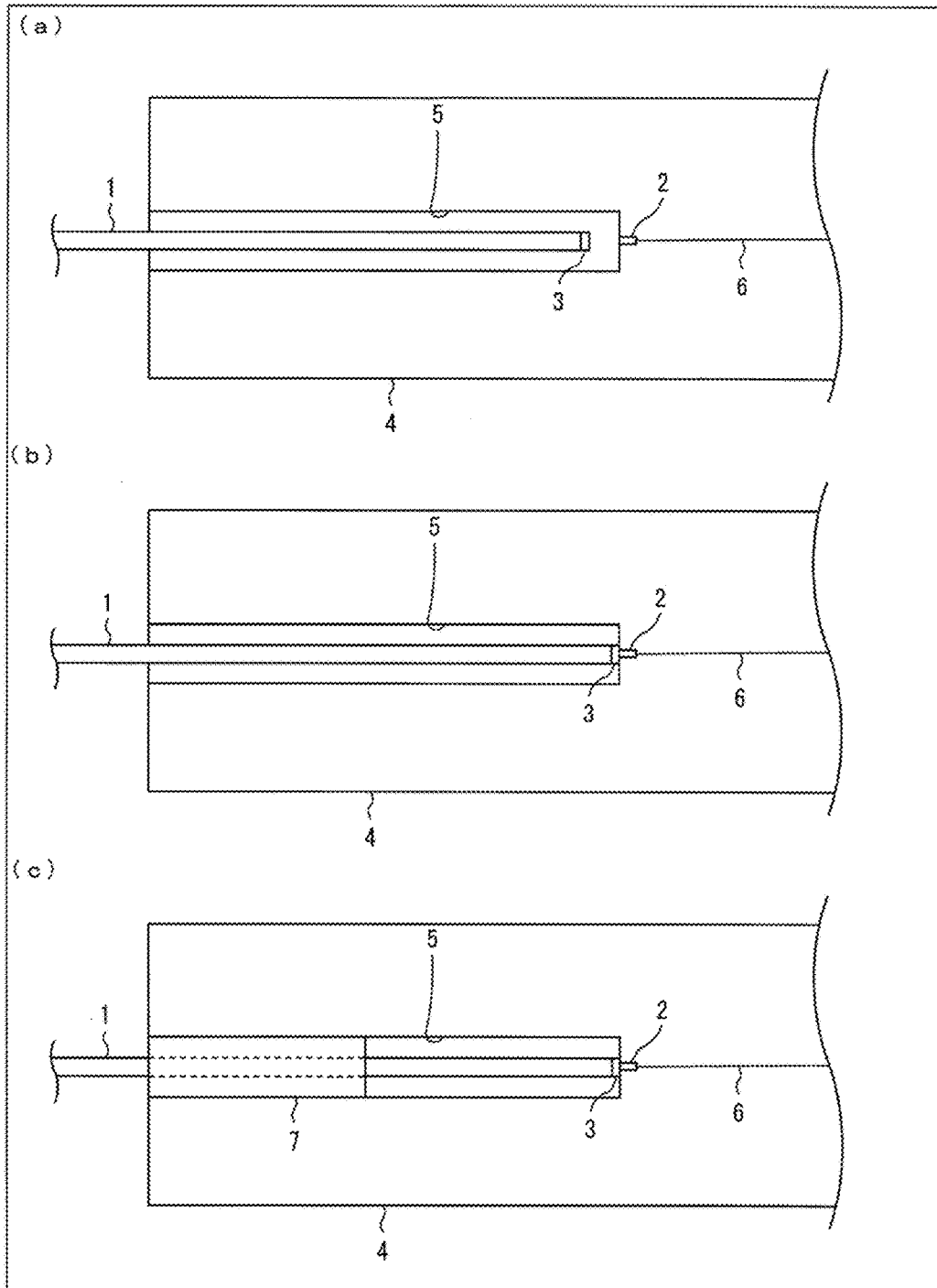
FIG. 5 illustrates a connection method in accordance with an embodiment of the present invention. (a) of FIG. 5 is a top view of a semiconductor optical device before temporary fixing. (b) of FIG. 5 is a top view of the semiconductor optical device after temporary fixing and before fixing by use of an ultraviolet curing resin. (c) of FIG. 5 is a top view of the semiconductor optical device after fixing by use of the ultraviolet curing resin.

FIG. 5 is a top view illustrating a connection method in accordance with the present embodiment. (a) of FIG. 5 illustrates a state before temporary fixing. (b) of FIG. 5 illustrates a state after temporary fixing and before fixing by use of the ultraviolet curing resin 7. (c) of FIG. 5 illustrates a state after fixing by use of the ultraviolet curing resin 7.

First, as illustrated in (a) of FIG. 5, the highly-viscous resin 3 is provided on the end surface of the optical fiber 1. As the highly-viscous resin 3, a two-part resin that is cured by electric conduction or a sheet resin can be used. In order that the highly-viscous resin 3 has a thickness of approximately 10 μm after having been butted against the core part 8 (described earlier), the thickness of the highly-viscous resin 3 which is illustrated in (a) of FIG. 5 and has not been butted against the core part 8 is set at approximately 25 μm.

Note that it is possible to prepare, in advance, the optical fiber 1 whose end surface is provided with the highly-viscous resin 3. Further, it is also possible to preserve, for a long term, the optical fiber 1 whose end surface is provided with the highly-viscous resin 3.

According to the semiconductor optical device 100, there is no problem with preliminary preparation of an optical device such as an optical modulator. It is preferable to carry out a process in which a desired optical device is provided in the semiconductor optical device 100 and the optical fiber 1 is provided in that optical device.

Subsequently, as illustrated in (b) of FIG. 5, the end surface of the optical fiber 1 is temporarily fixed to an end surface of the mode field converter 2 (specifically, the core part 8) via the highly-viscous resin 3 (a temporarily fixing step, a fixing step). In this case, a lower half of the optical fiber 1 is inserted in the groove 5, and the highly-viscous resin 3 is butted against the end surface of the core part 8.

Note that in a case where an optical device that is provided at a subsequent stage of the fine line optical waveguide 6 is an optical modulator, it is possible to suitably carry out aligning of the optical fiber 1 with respect to the mode field converter 2 by use of a photodiode of the optical modulator. That is, the optical modulator is arranged so that an electric current flowing through the photodiode can be monitored. From the light source provided on the optical fiber 1 side, light is allowed to pass through the optical fiber 1, and a position of the optical fiber 1 with respect to the mode field converter 2 is determined so that the electric current flowing through the photodiode is sufficiently high and is sufficiently stabilized.

Note that aligning can be carried out not only in a state of temporary fixing (see (b) of FIG. 5) but also in a state before temporary fixing.

Subsequently, as illustrated in (c) of FIG. 5, while the optical fiber 1 is butted against the core part 8 of the mode field converter 2 through the highly-viscous resin 3, the optical fiber 1 is fixed to the substrate part 4 by applying the ultraviolet curing resin 7 to the groove 5. The optical fiber 1 can thus be fixed to the semiconductor optical device 100 while the end surface of the optical fiber 1 is butted against the end surface of the core part 8 through the highly-viscous resin 3.

Note that as described earlier, the ultraviolet curing resin 7 is applied at a place away from the mode field converter 2 at a certain distance (approximately several hundred μm to 1 mm). In other words, it is unnecessary to fix the end surface and/or its vicinity of the optical fiber 1 by use of the ultraviolet curing resin 7. Actually, in (c) of FIG. 5, the end surface or its vicinity of the optical fiber 1 is unfixed by use of the ultraviolet curing resin 7. This makes it possible to select the ultraviolet curing resin 7 without regard to a refractive index. For example, a resin which is non-transparent and in which less cure shrinkage occurs can be used as the ultraviolet curing resin 7. This makes it possible to prevent harmful influence(s) by cure shrinkage in the ultraviolet curing resin 7 (such as an optical loss caused by axial deviation in the optical fiber 1 and/or deformation in the mode field converter 2).

The following description discusses a case where the end surface or its vicinity of the optical fiber 1 is unfixed by use of the ultraviolet curing resin 7. In this case, if the end surface of the optical fiber 1 is free with respect to the end surface of the core part 8, axial deviation in the optical fiber 1 occurs during curing of the ultraviolet curing resin 7 and application of the ultraviolet curing resin 7 to a part, different from the end surface or its vicinity, of the optical fiber 1. In order to solve the axial deviation, it is effective to carry out temporary fixing by use of the highly-viscous resin 3. With this, without the need to fix the end surface or its vicinity of the optical fiber 1 by use of the ultraviolet curing resin 7, it is possible to prevent the axial deviation in the optical fiber 1 and allow the optical fiber 1 and the mode field converter 2 to be coupled with higher efficiency. Further, it is also possible to prevent reflection of light by a matching effect yielded by connecting the optical fiber 1 and the core part 8.

Figure 6:
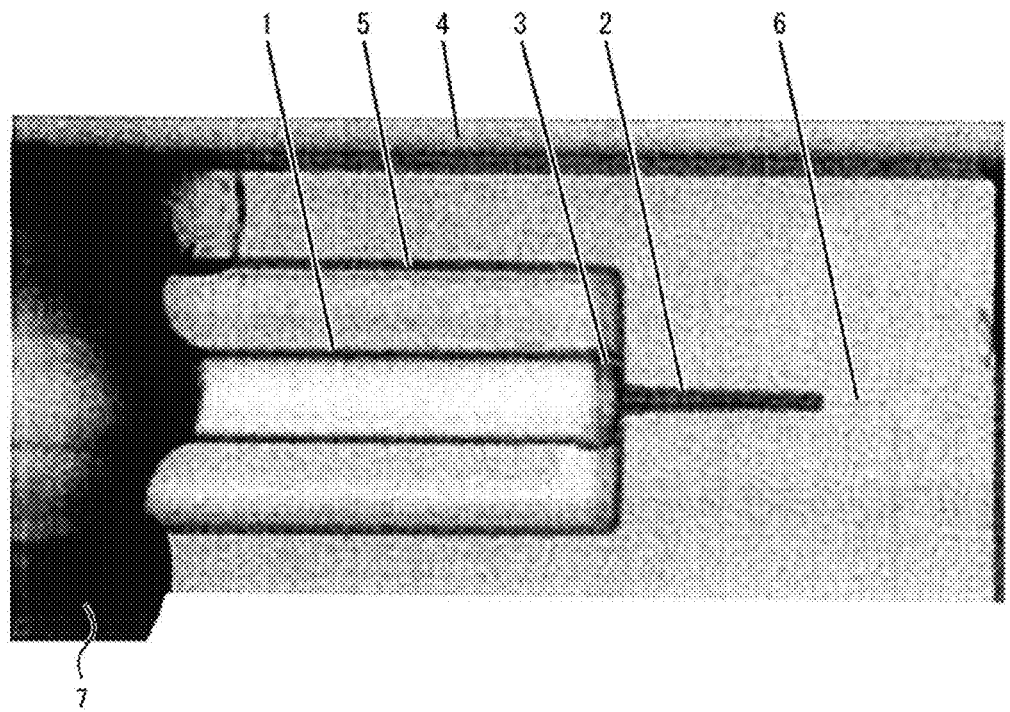
FIG. 6 is a top photograph corresponding to (c) of FIG. 5.

FIG. 6 is a top photograph corresponding to (c) of FIG. 5.

Further, the semiconductor optical device 100 can be said to be arranged to include the core part 8, which has a taper shape, the core part 8 having the end surface to which the end surface of the optical fiber 1 is connected via the highly-viscous resin 3 which is viscous.

According to the connection method illustrated in (a) through (c) of FIG. 5, it is possible to fix the optical fiber 1 to the core part 8 without the need to fix the end surface and/or its vicinity of the optical fiber 1 by use of the ultraviolet curing resin. Thus, it is possible to prevent the ultraviolet curing resin 7 from flowing into the air clad part 11 and prevent a deterioration in mode field diameter conversion performance. This makes it possible to achieve the semiconductor optical device 100 in which a deterioration in mode field diameter conversion performance is prevented.

According to the connection method illustrated in (a) through (c) of FIG. 5, it is possible to say the following. Specifically, by temporarily fixing the end surface of the optical fiber 1 to the end surface of the core part 8, it is possible to (i) prevent an optical loss by preventing axial deviation in the optical fiber 1 which axial deviation is caused by cure shrinkage in the ultraviolet curing resin 7 and (ii) prevent deformation in the mode field converter 2. This makes it possible to achieve the semiconductor optical device 100 which has high quality and in which an optical loss is prevented and deformation in the mode field converter 2 is prevented.

In a case where the air clad part 11 is provided, a problem in association with deformation in the mode field converter 2 more conspicuously appears. Further, in a case where the core part 8 is arranged to be surrounded by the air clad part 11, the ultraviolet curing resin 7 conventionally easily flows into the air clad part 11. Note, however, that the connection method illustrated in (a) through (c) of FIG. 5 makes it possible to solve the flow of the ultraviolet curing resin 7 into the air clad part 11. In other words, in a case where the air clad part 11 which surrounds the core part 8 is provided, it is possible to more effectively obtain an advantage brought by such a connection method.

As illustrated in FIG. 10, it is preferable to provide the highly-viscous resin 3 so that the highly-viscous resin 3 is extended to a part of the substrate part 4 which part constitutes the groove 5. In the example shown in FIG. 10, the highly-viscous resin 3 is in a shape of a sheet of 200 μm in length and 100 μm in width, and has an end that extends to the part of the substrate part 4 which part constitutes the groove 5. With this, the groove 5 is partially blocked. In a case where the groove 5 is formed by an etching process, a hole having a width of approximately not less than 60 μm in the worst case is formed between the optical fiber 1 and the groove 5, and the highly-viscous resin 3 in the shape of a sheet can be said to have a function of closing the hole.

The arrangement allows the highly-viscous resin 3 to have a larger area. Thus, particularly in a case where the optical fiber 1 side end surface of the core part 8 is unfixed to the substrate part 4 (i.e., the core part 8 has a cantilever structure), the core part 8 is reinforced, so that the core part 8 can be prevented from being broken. Further, since it is possible to block the ultraviolet curing resin 7 with the highly-viscous resin 3, it is possible to further prevent a deterioration in mode field diameter conversion performance. As illustrated in FIG. 10, use of the highly-viscous resin 3 in the shape of a sheet makes it comparatively easy to provide the highly-viscous resin 3 so that the highly-viscous resin 3 is extended to the substrate part 4.

Figure 7:
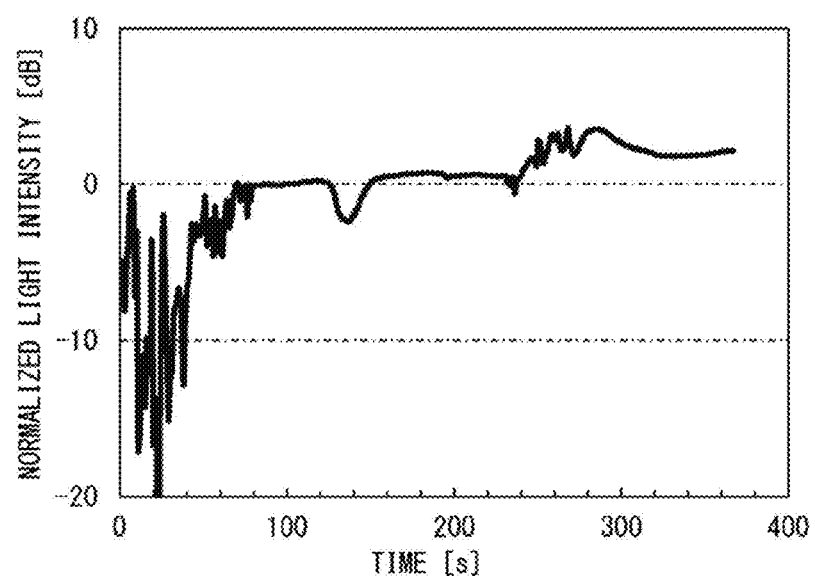
FIG. 7 is a graph showing a relationship between elapsed time and a normalized light intensity for each process of a connection method in accordance with an embodiment of the present invention.

FIG. 7 is a graph showing a relationship between elapsed time and a normalized light intensity for each process of the connection method in accordance with the present embodiment. Specifically, FIG. 7 shows a result obtained by transmitting light from the optical fiber 1 to an optical modulator which is provided at a subsequent stage of the fine line optical waveguide 6, and monitoring an intensity (normalized light intensity) of output light by use of a photodiode of the optical modulator. In the graph of FIG. 7, a horizontal axis shows elapsed time (unit: second), and a vertical axis shows a normalized light intensity (unit: dB).

In a first half of a step illustrated in (b) of FIG. 5 (0 s to 80 s in FIG. 7), the optical fiber 1 is not temporarily fixed to the core part 8. During this time, the normalized light intensity is low and violently fluctuates depending on elapsed time. The fluctuation is considered to be mainly due to an air current caused by a mechanical vibration of an aligning device, air conditioning, and/or the like.

In a second half of the step illustrated in (b) of FIG. 5 (80 s to 175 s in FIG. 7), the optical fiber 1 is temporarily fixed to the core part 8 by use of the highly-viscous resin 3. During this time, the normalized light intensity is stable at approximately 0 dB due to an advantage brought by carrying out the temporary fixing by use of the highly-viscous resin 3. The normalized light intensity decreases around 150 s to 160 s in FIG. 7. Note, however, that this merely means that the optical fiber 1 is detached from the core part 8 at that moment during an aligning process. Aligning is carried out so that the normalized light intensity is maximized, and the process proceeds to a step illustrated in (c) of FIG. 5.

In a first half of the step illustrated in (c) of FIG. 5 (175 s to 240 s in FIG. 7), the ultraviolet curing resin 7 is applied to the groove 5, and the optical fiber 1 has not been sufficiently fixed to the semiconductor optical device 100. During this time, the normalized light intensity is also stable at approximately 0 dB due to an advantage brought by carrying out the temporary fixing by use of the highly-viscous resin 3. The connection method illustrated in FIG. 5 uses, as the ultraviolet curing resin 7, a resin that is non-transparent and has a cure shrinkage of not more than 1%.

In a second half of the step illustrated in (c) of FIG. 5 (240 s and later in FIG. 7), the ultraviolet curing resin 7 is cured, so that the optical fiber 1 is sufficiently fixed to the semiconductor optical device 100. During this time, the normalized light intensity is stable at approximately 0 dB due to an advantage brought by carrying out the temporary fixing by use of the highly-viscous resin 3. Note, however, that in the second half of the step illustrated in (c) of FIG. 5, the normalized light intensity has a value slightly higher than that in the first half of the step illustrated in (c) of FIG. 5 and slightly fluctuates depending on elapsed time. The fluctuation is considered to be caused by the fact that the photodiode of the optical modulator receives an ultraviolet ray with which to irradiate the ultraviolet curing resin 7 during the curing of the ultraviolet curing resin 7, and it is confirmed that the fluctuation is not a phenomenon caused by axial deviation in the optical fiber 1.

(a) of FIG. 8 is a graph showing a relationship between elapsed time and a normalized light intensity in a case where no highly-viscous resin 3 is provided. (b) of FIG. 8 is a graph showing a relationship between elapsed time and a normalized light intensity in a case where the ultraviolet curing resin 7 is applied to a vicinity of the end surface of the optical fiber 1. (a) and (b) of FIG. 8 are each identical to FIG. 7 in definition of the horizontal axis and the vertical axis.

In a case where no highly-viscous resin 3 is provided and the ultraviolet curing resin 7 has not been applied (0 s to 180 s in (a) of FIG. 8), the optical fiber 1 is free with respect to the core part 8. Thus, as a result of carrying out aligning, the normalized light intensity is around 0 dB. Note, however, that for a reason similar to that in the case of the first half of the step illustrated in (b) of FIG. 5, the normalized light intensity violently fluctuates depending on elapsed time.

In a case where no highly-viscous resin 3 is provided and the ultraviolet curing resin 7 has been applied (180 s and later in (a) of FIG. 8), axial deviation occurs in the optical fiber 1. This makes it impossible to obtain a desired normalized light intensity.

Subsequently, the ultraviolet curing resin 7 is applied to the vicinity of the end surface of the optical fiber 1. The ultraviolet curing resin 7 used in the application is set to have a specific refractive index of 1.35 and a cure shrinkage of 9.8%.

After the application of the ultraviolet curing resin 7 and before curing of the ultraviolet curing resin 7 (0 s to 120 s in (b) of FIG. 8), the normalized light intensity is stable at approximately 0 dB due to an advantage brought by carrying out the temporary fixing by use of the highly-viscous resin 3.

After the curing of the ultraviolet curing resin 7 (160 s and later in (b) of FIG. 8), a flow of the ultraviolet curing resin 7 into the air clad part 11 causes a loss of approximately 10 dB in the normalized light intensity. This makes it impossible to obtain a desired normalized light intensity. Examples of another reason for which a desired normalized light intensity cannot be obtained include axial deviation in the optical fiber 1 and deformation in the mode field converter 2 due to contraction stress of the ultraviolet curing resin 7. A structure in which the semiconductor optical device 100, especially the mode field converter 2 is easily affected by the contraction stress of the ultraviolet curing resin 7 is not preferable from the viewpoint of protection of the mode field converter 2.

A comparison between (i) FIG. 7 and (ii) (a) and (b) of FIG. 8 makes it possible to prove that the connection method illustrated in (a) through (c) of FIG. 5 is effective.

The following description studies a preferable refractive index of the highly-viscous resin 3. (a) of FIG. 9 is a graph showing a relationship between a specific refractive index of the highly-viscous resin 3 and an amount of light reflected from a boundary between the highly-viscous resin 3 and an end surface of the optical fiber 1. (b) of FIG. 9 is a graph showing a relationship between a specific refractive index of the highly-viscous resin 3 and an amount of light reflected from a boundary between the highly-viscous resin 3 and an end surface of the core part 8.

Generally, a light beam outputted from an optical waveguide to a space is known as a Gaussian beam. In the Gaussian beam, an angle of radiation is determined merely in accordance with a spot diameter of a luminous point, a wavelength, and a refractive index of a propagated substance.

In a case where a diameter of a beam is $2\omega_0$, a spreading half angle is $\Delta\theta$, a wavelength of light is $\lambda$, and a refractive index of a propagated substance is n, the following equation (1) holds true.

$$\Delta\theta = \lambda/n\pi\omega_0 \tag{1}$$

Note here that a result of examination of a relationship between a refractive index of the highly-viscous resin 3 and an angle of radiation shows that the angle of radiation is made smaller as the highly-viscous resin 3 has a higher refractive index.

In (a) and (b) of FIG. 9, the horizontal axis shows a specific refractive index of the highly-viscous resin 3, and the vertical axis shows an amount of light reflected (unit: dB). Assume that the semiconductor optical device 100 and the optical fiber 1 are connected. In this case, it is only necessary to set a refractive index of the highly-viscous resin 3 so that an amount of light reflected from the boundary between the highly-viscous resin 3 and the end surface of the optical fiber 1 is less than −27 dB (indicated by an alternate long and short dashed line in (a) of FIG. 9) and an amount of light reflected from the boundary between the highly-viscous resin 3 and the end surface of the core part 8 is less than −27 dB (indicated by an alternate long and short dashed line in (b) of FIG. 9).

(a) of FIG. 9 shows that the highly-viscous resin 3 which has a specific refractive index of not less than 1.34 and not more than 1.59 causes light to be reflected from the boundary between the highly-viscous resin 3 and the end surface of the optical fiber 1 in an amount of less than −27 dB. Meanwhile, (b) of FIG. 9 shows that the highly-viscous resin 3 which has a specific refractive index of not less than 1.32 and not more than 1.57 causes light to be reflected from the boundary between the highly-viscous resin 3 and the end surface of the core part 8 in an amount of less than −27 dB. The above results show that the highly-viscous resin 3 preferably has a specific refractive index of not less than 1.34 and not more than 1.57 in each of the examples shown in (a) and (b) of FIG. 9.

Further, the highly-viscous resin 3 may be set to have a specific refractive index that is not less than 80% and not more than 120% of the specific refractive index of the core part 8.

In a case where a preferable specific refractive index is set for the highly-viscous resin 3 as described above, it is possible to prevent a loss of light among the optical fiber 1, the highly-viscous resin 3, and the core part 8.

The following description studies a pressure of the highly-viscous resin 3.

In accordance with a density and an amount of the highly-viscous resin 3, the highly-viscous resin 3 is estimated to have a weight of 0.925 mg.

In this case, gravity affecting the highly-viscous resin 3 is expressed by the following equation (2).

$$F(\text{unit}:N) = mg = \text{approximately } 90 \times 10^{-4} \quad (2)$$

Further, an area of application of the highly-viscous resin 3 is found based on the following equation (3).

$$\pi r^2(\text{unit}:m^2) = \text{approximately } 1.4 \times 10^{-8} \quad (3)$$

In a case where the equation (2) is divided by the equation (3), a solution of a pressure of approximately 62 N/cm² is obtained. Note, however, that out of m and g in the equation (2) and n and r in the equation (3), an amount of the highly-viscous resin 3 may differ for each semiconductor optical device 100. Thus, the solution is considered to be a pressure of 30 N/cm² to 300 N/cm². In view of this, the highly-viscous resin 3 preferably has a viscosity of not less than 30 Pa·S. Note that since the highly-viscous resin 3 which has an extremely high viscosity is not preferable, the highly-viscous resin 3 preferably has a viscosity of not more than 1000 Pa·S.

Examples of a case where a mode field diameter is set include a case where a mode field diameter of light that passes through the optical fiber 1 is set at not less than 7 μm and not more than 13 μm, and a case where a mode field diameter of light that passes through the core part 8 (mode field converter 2) is set at not less than 400 nm and not more than 5 μm.

It is possible to use a photo-curable resin instead of the ultraviolet curing resin 7.

Further, a method for manufacturing the semiconductor optical device 100 to which the optical fiber 1 is connected, including the connection method described earlier is also encompassed in the scope of the present invention.

As a modified example in accordance with FIGS. 1 and 5, the end surface of the optical fiber 1 may be provided with an elastic temporarily fixing member instead of the highly-viscous resin 3. In a case where the end surface of the optical fiber 1 is fixed to a chip (suspended coupler), the end surface of the optical fiber 1 may be fixed to the chip such that the temporarily fixing member is pressed onto the chip, the temporarily fixing member is elastically deformed, and the end surface of the optical fiber 1 is fixed by a frictional force generated between the temporarily fixing member and the chip by a force of reaction from the elastic deformation. Examples of the elastic temporarily fixing member include a temporarily fixing member whose refractive index matches a refractive index of each of the optical fiber 1 and the core part 8, whose thickness is not less than 5 μm and not more than 50 μm, and whose coefficient of static friction with quartz (silica) is not less than 0.1 and not more than 1.0, and whose coefficient of elasticity is not more than $\frac{1}{100}$ of that of quartz. The temporarily fixing member whose refractive index matches the refractive index of each of the optical fiber 1 and the core part 8 makes it possible to prevent reflection of light. The temporarily fixing member whose thickness is not less than 5 μm and not more than 50 μm makes it possible to apply stress, without a load, to each of the core part 8 and the optical fiber 1 and makes it possible to sufficiently attenuate reflection of light (in association with a contact tolerance). The temporarily fixing member whose coefficient of static friction is not less than 0.1 and not more than 1.0 makes it possible to prevent the optical fiber 1 from sliding through the core part 8. The temporarily fixing member whose coefficient of elasticity is not more than $\frac{1}{100}$ of that of quartz makes it easy to apply stress only to the temporarily fixing member.

CONCLUSION

A connection method in accordance with the present embodiment for connecting an optical fiber to an optical waveguide provided in a semiconductor optical device, includes: (a) temporarily fixing an end surface of the optical fiber to an end surface of the optical waveguide via a temporarily fixing member; and (b) after the step (a), while butting the end surface of the optical fiber against the end surface of the optical waveguide through the temporarily fixing member, fixing the optical fiber to the semiconductor optical device at a place away from the end surface of the optical fiber.

With the arrangement, the end surface of the optical fiber is temporarily fixed to the end surface of the optical waveguide. This makes it possible to (i) prevent an optical loss by preventing axial deviation in the optical fiber which axial deviation is caused by cure shrinkage in, for example, an ultraviolet curing resin and (ii) prevent deformation in a mode field converter.

The connection method in accordance with the present embodiment is preferably arranged such that the temporarily fixing member is viscous.

The connection method in accordance with the present embodiment is preferably arranged such that a space that surrounds the optical waveguide is provided.

Provision of a space that surrounds the optical waveguide and is typified by a clad filled with air causes the problem (A) (described earlier) to more conspicuously appear. In other words, provision of the space that surrounds the optical waveguide makes it possible to effectively obtain an advantage brought by the present embodiment.

Note that provision of the space that surrounds the optical waveguide newly causes the following problem (B).

(B) A flow of, for example, an ultraviolet curing resin for fixing into a clad (i.e., a space that surrounds a tapered optical waveguide) may (i) cause the clad to change in refractive index and (ii) cause a deterioration in mode field diameter conversion performance carried out by a mode field converter.

The arrangement makes it possible to solve the flow of, for example, the ultraviolet curing resin into the clad and thus makes it possible to prevent a deterioration in mode field diameter conversion performance.

The connection method in accordance with the present embodiment is preferably arranged such that the temporarily fixing member has a viscosity of not less than 30 Pa·S and not more than 1000 Pa·S.

The arrangement allows the temporarily fixing member to have a viscosity that is suitable to temporarily fix and fix the end surface of the optical fiber to the end surface of the optical waveguide.

The connection method in accordance with the present embodiment is preferably arranged such that a specific refractive index of the temporarily fixing member is set so that an amount of light reflected from a boundary between the temporarily fixing member and the end surface of the optical fiber is less than −27 dB and an amount of light reflected from a boundary between the temporarily fixing member and the end surface of the optical waveguide is less than −27 dB.

The connection method in accordance with the present embodiment is preferably arranged such that the temporarily fixing member has a specific refractive index that is not less than 80% and not more than 120% of a specific refractive index of the optical waveguide.

The arrangement makes it possible to prevent a loss of light among the optical fiber, the temporarily fixing member, and the optical waveguide.

The connection method in accordance with the present embodiment is preferably arranged such that: at least a part of the optical fiber is inserted in a groove that is provided in a substrate part of the semiconductor optical device; and the temporarily fixing member is provided so as to be extended to a part of the substrate part which part constitutes the groove.

The arrangement allows the temporarily fixing member to have a larger area. Thus, particularly in a case where the optical fiber side end surface of the optical waveguide is unfixed to the substrate part (i.e., the optical waveguide has a cantilever structure), the optical waveguide is reinforced, so that the optical waveguide can be prevented from being broken. Further, since the arrangement makes it possible to block an ultraviolet curing resin or the like with the temporarily fixing member, it is possible to further prevent a deterioration in mode field diameter conversion performance.

The connection method in accordance with the present embodiment is preferably arranged such that: light that passes through the optical fiber has a mode field diameter of not less than 7 μm and not more than 13 μm; and light that passes through the optical waveguide has a mode field diameter of not less than 400 nm and not more than 5 μm.

The connection method in accordance with the present embodiment is preferably arranged such that the temporarily fixing member is elastic.

A semiconductor optical device in accordance with the present embodiment includes: an optical waveguide, the optical waveguide having an end surface to which an end surface of an optical fiber is connected via a fixing member.

With the arrangement, in order to connect the end surface of the optical fiber to the end surface of the optical waveguide, it is possible to fix the optical fiber to the optical waveguide without the need to fix the end surface and/or its vicinity of the optical fiber by use of, for example, an ultraviolet curing resin. This makes it possible to achieve a high-quality semiconductor optical device in which (i) an optical loss is prevented by preventing axial deviation in the optical fiber which axial deviation is caused by cure shrinkage in, for example, an ultraviolet curing resin and (ii) deformation in a mode field converter is prevented.

The semiconductor optical device in accordance with the present embodiment is preferably arranged such that the optical waveguide is surrounded by a space and has a cantilever structure in which the end surface of the optical waveguide is unfixed to a substrate part of the semiconductor optical device.

The arrangement prevents an ultraviolet curing resin or the like from flowing into the space (clad) which surrounds the optical waveguide (core). As a result, it is possible to achieve a semiconductor optical device in which a deterioration in mode field diameter conversion performance is prevented.

A method in accordance with the present embodiment for manufacturing a semiconductor optical device to which an optical fiber is connected, the method includes: (a) fixing an end surface of the optical fiber to an end surface of an optical waveguide of the semiconductor optical device via a fixing member; and (b) after the step (a), while butting the end surface of the optical fiber against the end surface of the optical waveguide through the fixing member, fixing the optical fiber to the semiconductor optical device at a place away from the end surface of the optical fiber.

The arrangement makes it possible to manufacture the semiconductor optical device in accordance with the present embodiment.

Note that each of the temporarily fixing member and the fixing member can be assumed to be provided to, for example, the end surface of the optical fiber or the end surface of the optical waveguide.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to a method for connecting an optical fiber to a tapered optical waveguide provided in a semiconductor optical device, a semiconductor optical device, and a method for manufacturing a semiconductor optical device to which an optical fiber is connected.

REFERENCE SIGNS LIST

1 Optical fiber
2 Mode field converter
3 Highly-viscous resin (temporarily fixing member, fixing member)
4 Substrate part
4a Silica layer
4b Silicon substrate
5 Groove
6 Fine line optical waveguide
7 Ultraviolet curing resin
8 Core part (optical waveguide)
11 Air clad part (space)
12 Bridge
100 Semiconductor optical device

The invention claimed is:

1. A connection method for connecting an optical fiber to an optical waveguide provided in a semiconductor optical device, comprising:
   (a) butting an end surface of the optical fiber against an end surface of the optical waveguide via a sheet resin; and
   (b) after the step (a), while butting the end surface of the optical fiber against the end surface of the optical waveguide through the sheet resin, fixing the optical fiber to the semiconductor optical device at a place away from the end surface of the optical fiber,
   the optical waveguide having a clad made of silica,
   the sheet resin being viscous, and
   the sheet resin having a viscosity of not less than 30 Pa·S and not more than 1000 Pa·S.

2. The connection method as set forth in claim 1, wherein a space that surrounds the optical waveguide is provided.

3. The connection method as set forth in claim 1, wherein a specific refractive index of the sheet resin is set so that an amount of light reflected from a boundary between the sheet resin and the end surface of the optical fiber is less than −27 dB and an amount of light reflected from a boundary between the sheet resin and the end surface of the optical waveguide is less than −27 dB.

4. The connection method as set forth in claim 1, wherein the sheet resin has a specific refractive index that is not less than 80% and not more than 120% of a specific refractive index of the optical waveguide.

5. The connection method as set forth in claim 1, wherein:
   at least a part of the optical fiber is inserted in a groove that is provided in a substrate part of the semiconductor optical device; and
   the sheet resin is provided so as to be extended to a part of the substrate part which part constitutes the groove.

6. The connection method as set forth in claim 1, wherein:
   light that passes through the optical fiber has a mode field diameter of not less than 7 µm and not more than 13 µm; and
   light that passes through the optical waveguide has a mode field diameter of not less than 400 nm and not more than 5 µm.

7. A semiconductor optical device comprising:
   an optical waveguide,
   the optical waveguide having an end surface to which an end surface of an optical fiber is connected via a resin sheet,
   the optical waveguide having a clad made of silica,
   the sheet resin being viscous, and
   the sheet resin having a viscosity of not less than 30 Pa·S and not more than 1000 Pa·S.

8. The semiconductor optical device as set forth in claim 7, wherein the optical waveguide is surrounded by a space and has a cantilever structure in which the end surface of the optical waveguide is unfixed to a substrate part of the semiconductor optical device.

9. A method for manufacturing a semiconductor optical device to which an optical fiber is connected,
   said method comprising:
   (a) butting an end surface of the optical fiber against an end surface of an optical waveguide of the semiconductor optical device via a resin sheet; and
   (b) after the step (a), while butting the end surface of the optical fiber against the end surface of the optical waveguide through the resin sheet, fixing the optical fiber to the semiconductor optical device at a place away from the end surface of the optical fiber,
   the optical waveguide having a clad made of silica,
   the sheet resin being viscous, and
   the sheet resin having a viscosity of not less than 30 Pa·S and not more than 1000 Pa·S.

10. The connection method as set forth in claim 1, wherein the sheet resin has a thickness of not less than 5 µm and not more than 50 µm.

* * * * *